April 29, 1952  H. G. EARLS ET AL  2,594,887

ELECTROMECHANICAL TRIGONOMETRIC CONVERTER

Filed April 21, 1949

Inventors:
Howard G. Earls,
Wallace B. Watson,
by Merton D. Morse
Their Attorney.

Patented Apr. 29, 1952

2,594,887

UNITED STATES PATENT OFFICE 2,594,887

ELECTROMECHANICAL TRIGONOMETRIC CONVERTER

Howard G. Earls, Syracuse, and Wallace B. Watson, Clay, N. Y., assignors to General Electric Company, a corporation of New York Application April 21, 1949, Serial No. 88,786

7 Claims. (Cl. 235—61)

This invention relates generally to the production of voltage components whose magnitudes vary as a trigonometric function of an angle, and, more particularly, to an electro-mechanical device for producing such voltages.

It is an object of this invention to provide an electro-mechanical device for producing sinusoidal and cosinusoidal components of a voltage.

A further object of this invention is to provide an electro-mechanical device for producing, with greater accuracy than heretofore possible, a pair of voltages which vary as the product of an applied voltage, and the sine and cosine of a variable angle respectively.

A further object of this invention is to provide a new and improved mechanical linkage for converting an angular motion into a pair of linear motions proportional to the sine and cosine, respectively, of the angular motion.

For further objects and advantages, and for a better understanding of the invention, attention is now directed to the following description and accompanying drawings and also to the appended claims in which the features of the invention believed to be novel are more particularly pointed out.

It is frequently necessary to produce voltages which vary as the product of an input voltage and a trigonometric function of an angle. For instance, in a rectangular coordinate system utilizing electrical or magnetic fields at right angles, it is possible to produce a resultant field of constant intensity, at any angle with respect to the co-ordinates, by causing the two fields to have magnitudes proportional to the sine and cosine respectively of the desired angle. Where it is desired to vary the angle, it is necessary to devise some easily adjustable means for obtaining the required trigonometric components. Heretofore, specially wound potentiometers or variable resistors have been available for this purpose. While devices of this type are useful for some applications, in general they are not accurate enough where precise measurements or representations of angular quantities are required.

In accordance with our invention, we employ a mechanical system for converting an angular motion into two linear motions which are functions of the sine and cosine respectively of an angle. Furthermore, we provide accurately wound potentiometers, in which the resistance at a movable connection is directly proportional to the displacement of a contact arm from a reference position. The linear movement previously mentioned is imparted to this contact arm by suitable coupling means. It has been found readily possible to manufacture linear potentiometers with a high degree of accuracy, and accordingly our invention provides sine and cosine components with the same high degree of accuracy.

Figure 1:
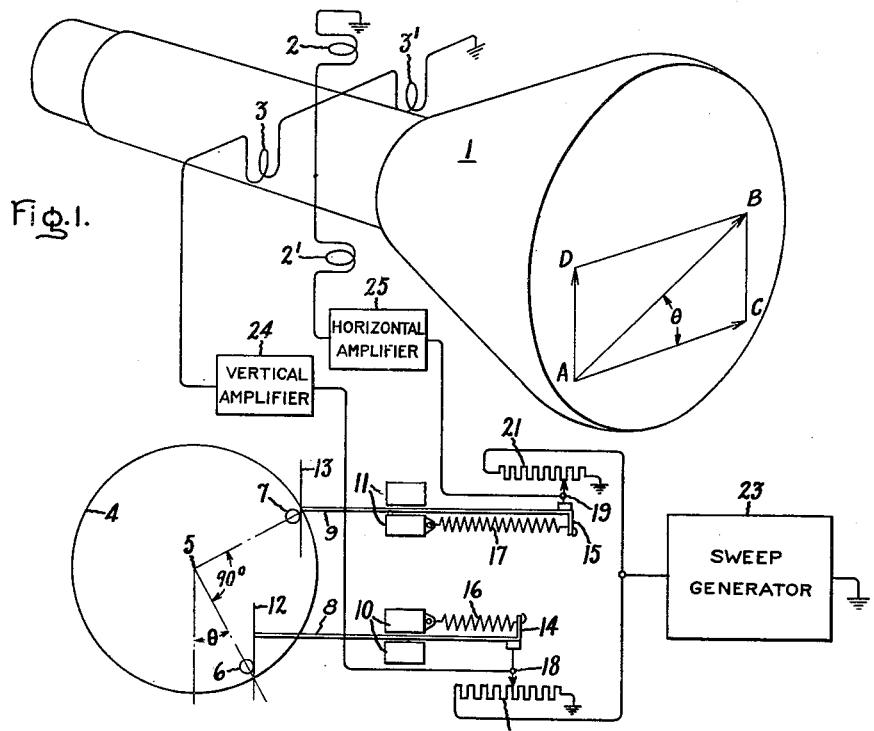
Fig. 1 is a mechanical and electrical schematic illustration of an embodiment of our invention utilized in conjunction with a cathode-ray indicating system.

Referring to Fig. 1 there is shown a schematic illustration of a sine and cosine converter embodying our invention which is employed in conjunction with a cathode ray tube indicator 1. The function of the converter in this particular application is to provide, from a sweep-voltage, a pair of sweep-voltage components which vary as the sine and cosine respectively of an angle $\theta$. It is desired to apply these voltages to the horizontal deflection coils 2 and 2', and to the vertical deflection coils 3 and 3' of the tube 1, so as to cause an electron beam to describe, on the end wall of the tube, a line AB at an angle $\theta$ with the horizontal, as represented by line AC.

The converter comprises a circular disc or plate 4, which can rotate or pivot about an axis 5. Mounted on the disc are a pair of pins or studs 6 and 7 which are located, one with respect to the other, at an angle of 90° on a circle drawn about the axis 5. A pair of elongated members 8 and 9 are constrained, by suitable guides 10 and 11, to longitudinal displacement along parallel axes. The elongated members carry, at one end, a pair of straight edge portions 12 and 13, and at the other, a pair of lateral extensions 14 and 15. A pair of tension springs 16 and 17, aligned substantially in the direction of the constrained displacement, are secured at one end to the guides 10 and 11, and at the other, to the extensions 14 and 15, and exert a force upon the members 8 and 9, causing the straight edges 12 and 13 to remain in contact with the pins 6 and 7 respectively. The elongated members 8 and 9 carry insulated sliding contact arms 18 and 19 which make connection to a pair of potentiometers 20 and 21 respectively.

One side of the potentiometers 20 and 21, is grounded and the other side is connected to a sweep-generator 23. As shown in Fig. 1, potentiometer 20 is the sinusoidal generator and its arm 18 is connected to a suitable amplifier 24 for supplying current to the vertical deflection coils 3 and 3'. Likewise the contact arm 19 of the potentiometer 21 is connected to a suitable amplifier 25 for supplying current to the horizontal deflecting coils 2 and 2'.

In operation, the linear displacement of the racks 8 and 9 varies as the sine and cosine respectively of the angle $\theta$ made by the stud 6 with the zero position of the disc 4. The linear motions of the racks cause proportional displacements of the contact arms 18 and 19 on the linear potentiometers 20 and 21, and, accordingly, the currents supplied to the deflection coils also vary as the sine and cosine respectively of the angle $\theta$. The individual components through the deflection coils would cause, on the face of the cathode-ray tube, separate deflections AD and AC, and, in accordance with well-known principles, these together produce the resultant AB at an angle with component AC or, in other words, with the horizontal axis.

Figure 2:
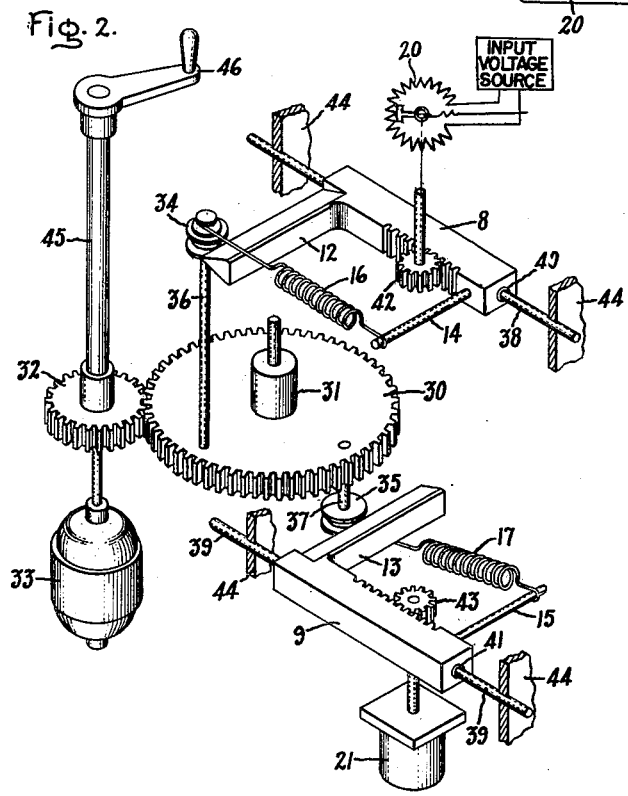
Fig. 2 is a pictorial drawing, partly cut away and expanded for the purpose of simplification, of a preferred form of a sine and cosine converter embodying our invention.

Referring to Fig. 2, there are shown therein certain mechanical details of a practical construction of a preferred embodiment of my invention. The same numerals have been used herein as in Fig. 1 to denote the same functional elements wherever practical. The rotating disc 4 is represented as a ring gear 30 mounted on a shaft 31, and having a toothed periphery, which engages with a pinion 32. The purpose of pinion 32 is to provide a means for accurately controlling the angular position of the ring gear 30, and it is driven by a shaft 45 which is in turn driven by a knob 46. Rotation of knob 46 also causes rotation of a suitable control element 33. The functions of the pins 6 and 7 are fulfilled by a pair of rollers 34 and 35, which can rotate about a pair of studs 36 and 37, of which the former is mounted on the upper surface, and the latter on the lower surface, of the ring gear 30. The rollers 34 and 35 have a rounded peripheral outline forming a grooved rim.

The elongated members 8 and 9 are constructed of one piece with their associated straight edge portions 12 and 13. These portions have a rounded V-shaped cross-section which permits a snug fit in the groove of the rollers 34 and 35. The radius of the edge of the portions 12 and 13 is slightly less than the radius of the groove in the rim of the rollers, so that contact is made at one point only and is maintained on a line along the rounded edge. Elongated members 8 and 9 have teeth cut along one of their sides as shown, thus constituting a pair of racks, which are supported by a pair of circular rods 38 and 39. These rods pass through suitable bushings 40 and 41 fitted into racks 8 and 9 and are terminated in a frame 44 partially shown in the drawing, which, in addition, supports the structure previously described. The function of the rods and bushings is to guide the elongated members 8 and 9 in their linear motions and to maintain them in parallel alignment, in the same manner as the guides 10 and 11 of Fig. 1.

The straight edge portions 12 and 13 are held in contact with the rollers 34 and 35 by means of tension springs 16 and 17 which are aligned substantially in the direction of the constrained motion of the members 8 and 9 and fastened to the lateral extensions 14 and 15 and to the studs 36 and 37 respectively. This particular method of mounting the springs has the advantage of applying force in a direction which is generally parallel to the direction of linear movement of the elongated members 8 and 9, and prevents any binding of the rods 38 and 39 in the bushings 40 and 41.

The linear motion of the elongated members 8 and 9 is communicated to the contact arms of a pair of potentiometers 20 and 21 by means of pinions 42 and 43 which engage the toothed edges or racks of these members. The potentiometers have resistance elements which are linearly wound on a circular core and have rotating contact arms. These potentiometers are linearly wound in the sense that the proportion of the total resistance between one end terminal and the connection point of the contact arm, to the total resistance between the two end terminals, is a function of the angular displacement of the contact arm. The voltage, from which sine and cosine components are to be obtained, is applied across the total resistance of the potentiometers, and the desired components are available at the contact arm terminals which are not shown in the drawing.

In operation, the rotation of the pinion 32 by knob 46 and shaft 45 imparts an angular displacement to ring gear 30 which causes a longitudinal displacement of the elongated members 8 and 9. The displacement of the members 8 and 9 in turn causes a rotation of the contact arms of the potentiometers 20 and 21, which is proportional to the sine and cosine respectively of the angular displacement of ring gear 30. Accordingly, when a voltage is applied across the terminals of the potentiometers, a voltage proportional to the product of the applied voltage and the sine and cosine respectively of the angular displacement of ring gear 30 is obtained at the connection point of the contact arms.

In an actual construction of a sine and cosine converter, in accordance with this embodiment of our invention, very accurate voltages were obtained. Using potentiometers in which the deviations from linearity did not exceed 0.15%, the maximum error or deviation from an exact sine and cosine function obtained in the output voltages did not exceed 0.2%. This accuracy is much superior to that obtainable with accurately wound sine potentiometers, with which the accuracy is considered exceptionally good when it attains 1%.

While a specific embodiment has been shown and described, it will, of course, be understood that various modifications may be made without departing from the invention. The appended claims are therefore intended to cover any such modifications within the true spirit and scope of the invention.

What we claim as new and desire to secure by Letters Patent of the United States is:

1. A system for deriving, from an applied voltage, a component proportional to the sine of a variable angle, comprising a plate rotatable about an axis to describe said angle, a roller, a stud mounted on one side of the said plate and supporting said roller in spaced position from said plate, a longitudinally slideable member, means to constrain said member to move in a straight line, said member comprising an end portion having a straight edge located in the plane of rotation of said roller and making a right angle with said straight line, tensioned spring means suspended between said member constrained to move in a straight line and said stud to hold said edge against said roller, and means, cooperating with said slideable member, for making a connection at an adjustable point in an electrical device to which said voltage is applied, said device being of the type in which the ratio of the voltage at a connection point to the applied voltage, is linearly proportional to the displacement of said connection from a fixed point.

2. A system for deriving, from an applied voltage, components proportional to the sine and cosine of a variable angle, comprising a pair of rollers, a plate rotatable about an axis to describe said angle, respective spaced studs mounted on said plate for supporting respective rollers in spaced relationship from said plate, a pair of longitudinally slideable members, means to constrain said members to move in straight parallel lines, each of said members comprising an end portion having a straight edge extending in one direction in the plane of rotation of one of said rollers and making a right angle with one of said straight lines, individual tensioned springs suspended between each stud and a portion of said member constrained to move in a straight line to hold said edges against respective rollers and means co-operating with said slideable members for making connections at a pair of adjustable points in a pair of electrical devices to which said voltage is applied, said devices being of the type in which the ratio of the voltage at a connection point to the applied voltage is linearly proportional to the displacement of said connection from a fixed point.

3. A system for deriving, from an applied voltage, a component proportional to the sine of a variable angle, comprising a roller having a concave periphery, a plate pivotable about an axis, a stud carried by said plate for supporting said roller in spaced relationship from said plate, said plate being rotated in operation so that a radial line through said roller makes said angle with a reference line, a longitudinally slideable member, means to constrain said member to move in a stright line, said member comprising an end portion having a straight edge extending in one direction in the plane of rotation of said roller and making a right angle with said straight line, a tensioned spring secured to said stud and to the portion of said member constrained to move in a straight line for holding said edge against said roller, and means co-operating with said slideable member for making a connection at an adjustable point in an electrical device to which said voltage is applied, said device being of the type in which the ratio of the voltage at a connection point to the applied voltage, is linearly proportional to the displacement of said connection from a fixed point.

4. A mechanism for accurately converting an angular displacement into a pair of linear displacements proportional to the sine and cosine respectively, of said angular displacement, comprising a plate mounted on a shaft secured to a frame, said plate being rotatable about the axis of said shaft, a pair of rollers mounted on pivot pins, one above and one below said plate, said pins being secured to said plate so that radial lines from said axis through their center make a right angle at said axis, said rollers having grooved rims, a pair of longitudinally slideable members, a pair of straight rods projecting through each of said members for constraining said members to move in parallel lines, each of said members comprising an end portion having a straight edge extending in one direction in the plane of rotation of one of said rollers and making a right angle with the direction of motion of said member, and a pair of tension springs, fixed to said pins at one end and to the portion of said members constrained to move in a straight line at the other, for holding said edges against said rollers at the grooved rims.

5. A mechanism for accurately converting an angular displacement into a pair of linear displacements proportional to the sine and cosine respectively, of said angular displacement, comprising a plate mounted on a shaft secured to a frame, said plate being rotatable about the axis of said shaft, a pair of rollers mounted on pivot pins, one above and one below said plate, said pins being secured to said plate so that radial lines from said axis through their center make a right angle at said axis, said rollers having a grooved rim, a pair of longitudinally slideable members, a pair of straight rods held rigidly in a frame, bushings in said slideable members for receiving said rods, said bushings being located to constrain said members to move in parallel lines, each of said members comprising an end portion having a straight edge extending in one direction in the plane of rotation of said roller and making a right angle with the direction of motion of said member, a lateral extension carried by each slideable member in spaced relation from each of said end portions and a pair of tension springs, each fixed to a respective pin at one end and to a respective lateral extension at the other for maintaining a holding force between said edge and said rollers which is substantially parallel to the direction of longitudinal movement of said slideable members.

6. A mechanism for accurately deriving, from an input voltage, a pair of output voltages proportional to the sine and cosine, respectively, of an angular displacement, comprising a plate mounted on a shaft secured to a frame, said plate being rotatable about the axis of said shaft, a pair of rollers mounted on pivot pins, one above and one below said plate, said pins being secured to said plate so that radial lines from said axis through their center make a right angle at said axis, said rollers having a grooved rim, a pair of longitudinally slideable members, a pair of straight rods held rigidly in a frame, bushings in each of said slideable members for receiving said rods, said bushings being located to constrain said members to move in parallel lines, each of said members comprising an end portion having a straight edge located in the plane of rotation of said roller and making a right angle with the direction of motion of said member, a pair of tension springs fixed to said pins at one end and to said members at the other for holding said edges against said rollers at the grooved rims, teeth cut into said slideable members forming a rack parallel to the direction of motion of said members, a pair of potentiometers across which said input voltage is applied, each of said potentiometers having a resistance element, circularly disposed, and a rotating contact arm for making connection to a portion of said resistance, said portion having a magnitude directly proportional to the angular displacement of said arm from a reference position, and a pair of pinions fixed to said arms and engaging said racks for mechanically interlinking said arms to said slideable members, said output voltages appearing at said contact arms.

7. In combination a driving roller, means for rotating said roller about an axis spaced from said roller, a driven member having a single edge supported within and extending across a segment of the path traversed by said roller, said roller having a groove engaging said edge, means for constraining movement of said driven member to a direction substantially at right angles to said edge, and means for maintaining said edge in driving power transfer contact with said groove comprising resilient means supported between said driven member and said driving roller.

HOWARD G. EARLS.
WALLACE B. WATSON.

REFERENCES CITED

The following references are of record in the file of this patent:

UNITED STATES PATENTS

| Number | Name | Date |
|---|---|---|
| 1,785,241 | Bates | Dec. 16, 1930 |
| 2,080,186 | Reymond | May 11, 1937 |

FOREIGN PATENTS

| Number | Country | Date |
|---|---|---|
| 558,619 | Great Britain | Jan. 13, 1944 |